United States Patent [19]

Peiffer et al.

[11] Patent Number: 4,470,583
[45] Date of Patent: Sep. 11, 1984

[54] HYDRO-PNEUMATIC TENSIONING UNIT FOR ENDLESS TRACK

[75] Inventors: Joachim Peiffer, Heiligenhaus-Isenbügel; Stephan Mütz, Düsseldorf, both of Fed. Rep. of Germany

[73] Assignee: Integral Hydraulik & Co., Düsseldorf, Fed. Rep. of Germany

[21] Appl. No.: 324,852

[22] Filed: Nov. 25, 1981

[30] Foreign Application Priority Data

Nov. 27, 1980 [DE] Fed. Rep. of Germany ....... 3044616

[51] Int. Cl.³ ............................................. B62D 55/30
[52] U.S. Cl. .............................. 267/64.26; 267/64.27; 305/10; 305/31
[58] Field of Search ...................... 188/314; 267/64.15, 267/64.19, 64.26, 64.27; 305/10, 31, 32

[56] References Cited

U.S. PATENT DOCUMENTS

| | | | |
|---|---|---|---|
| 2,315,421 | 3/1943 | Heaslet | 305/9 |
| 2,451,171 | 10/1948 | Mullen | 267/64.26 X |
| 2,561,901 | 7/1951 | Bachman et al. | 305/9 |
| 2,914,089 | 11/1959 | Allinguant | 267/64.27 X |

FOREIGN PATENT DOCUMENTS

| | | | |
|---|---|---|---|
| 1125778 | 3/1962 | Fed. Rep. of Germany . | |
| 1158379 | 6/1964 | Fed. Rep. of Germany . | |
| 478591 | 1/1938 | United Kingdom | 267/64.27 |
| 1086008 | 10/1967 | United Kingdom | 305/10 |

Primary Examiner—David A. Scherbel
Attorney, Agent, or Firm—Holman & Stern

[57] ABSTRACT

A hydro-pneumatic tensioning unit, particularly for use on a tracked vehicle for pressing a guide wheel against the tensed track comprising a cylinder and a tensioning piston, which piston defines a working space in the cylinder. A volume of gas is separated from said working space by a partition and a membrane which will withstand compression and acts against the partition. The edge of the membrane is attached either to the cylinder itself or to the interior of a hollow piston, by a holding member employing prestressing or compressive force. At least one penetration opening is provided in the partition which is attached to the cylinder or the piston. The partition limits the excursion of the membrane in the direction of the working space and its surface which faces the membrane is contoured to match the shape of the membrane.

14 Claims, 7 Drawing Figures

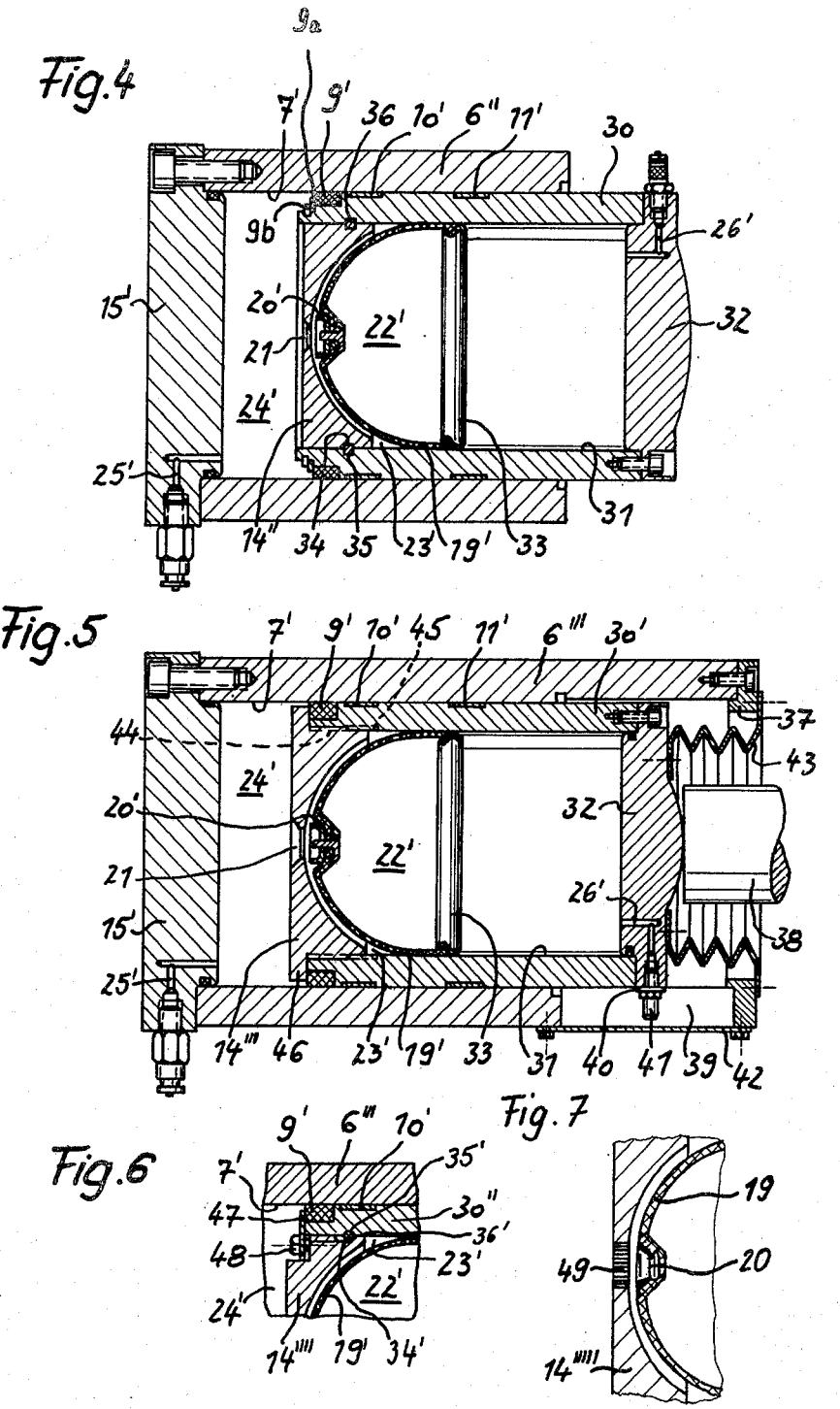

HYDRO-PNEUMATIC TENSIONING UNIT FOR ENDLESS TRACK

BACKGROUND OF THE INVENTION

1. Field of the Invention

The invention concerns a hydro-pneumatic tensioning unit, particularly for use on a tracked vehicle for pressing a guide wheel against the tensioned track.

2. Description of the Prior Art

There are numerous engineering applications of hydro-pneumatic tensioning units, particularly where there is a need for a rod which can yield when overloaded and can supply a restoring force when a load is removed. An example of an application is protection of a plowshare against overload damage when encountering large rocks in the soil. Another example is use in a mine prop when mining in areas subject to seismic disturbances. A mine prop in such a situation must be able to give way to some degree when subjected to a severe increase in ground pressure. Finally, hydro-pneumatic tensioning units are also commonly used for tensioning the tracks of tracked vehicles. They have the distinct advantage over mechanical-hydraulic or purely mechanical tensioning units (see, e.g., U.S. Pat. Nos. 2,315,421 and 2,561,901) that large forces can be developed with small available installation space, while the slope of the spring characteristic is kept low i.e., the spring constant is kept low. In addition, by simple changes in the pre-pressurization of the gas in the gas space it is possible to achieve different forces with the same installed masses. Known hydro-pneumatic tensioning devices (e.g., Ger AS No. 1,125,778 and Ger. Pat. No. 1,158,379) have complex structures and require a long length of space for insertion.

Where a piston is used as the separating member, there are the disadvantages that the piston must be furnished with dynamically loaded high pressure seals, the surrounding cylinder must be finely machined and dimensioned such that even at high pressure the cracks which may develop are not so great that they cannot be bridged by the high pressure seals, and it still is not possible to avoid leakage losses over time.

One may dispense with dynamically loaded high pressure seals if a bladder or diaphragm is used as the separating member, but such a device is accompanied by a complex and costly construction and an excessive length. The requirements in applications for overload protection for plows, or for tracked vehicles, are for a short structure, however.

SUMMARY OF THE INVENTION

The underlying object of the invention is thus to avoid these disadvantages by providing a hydro-pneumatic tensioning unit having the features of a short insertion length which is achieved with full functional reliability and with a small number of inexpensive component parts. Dynamically loaded high pressure seals for sealing the gas space should be done away with. It should be possible to manufacture the cylinder and, if necessary or desirable, the tensioning piston, from tubular parts. Finally, it should be possible to fill the working space with grease or with a liquid such as mineral oil.

The above-described object is achieved by the present invention.

The advantage of the invention lies in the fact that the only dynamically loaded seals are at the tensioning piston, and these do not need to be sealed against gas but only against lubricant (grease) or liquid.

According to one embodiment of the present invention, the membrane and membrane support may be housed in the cylinder.

According to another embodiment of the present invention, it is also possible to house the membrane and membrane support in the hollow tensioning piston, which allows even less insertion length.

The features of the invention and their engineering advantages will be seen further from the following description of exemplary embodiments in connection with the claims and the drawings.

BRIEF DESCRIPTION OF THE DRAWINGS

FIGS. 3 to 5 are longitudinal cross sectional views of variants of the hydro-pneumatic apparatus of a track tensioning unit in accordance with the invention;

FIG. 6 shows an embodiment of one of the features of the hydro-pneumatic apparatus; and FIG. 7 shows a variant of another of the features of the hydropneumatic apparatus.

DESCRIPTION OF THE PREFERRED EMBODIMENTS

Figure 1:
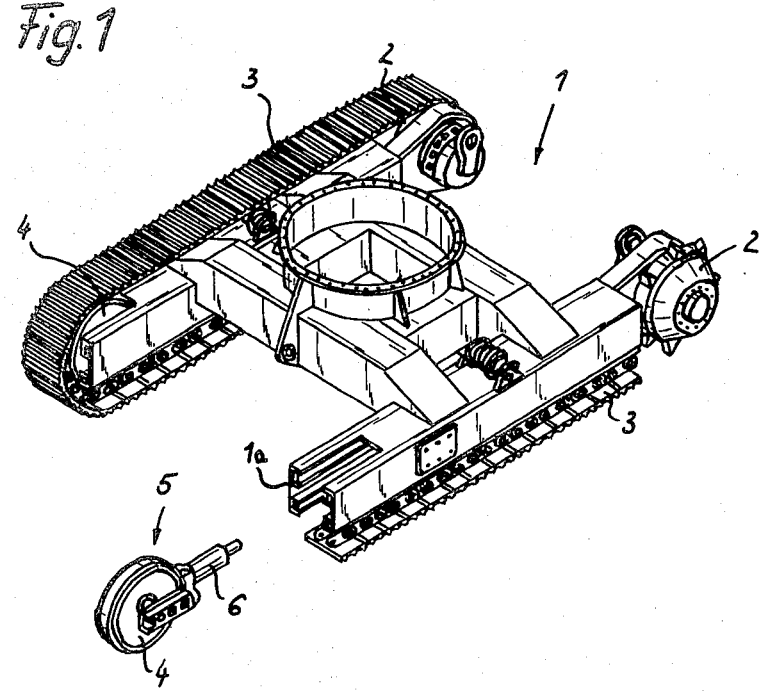
FIG. 1 is a perspective, partial breakaway view of a part of a tracked vehicle.
Figure 3:
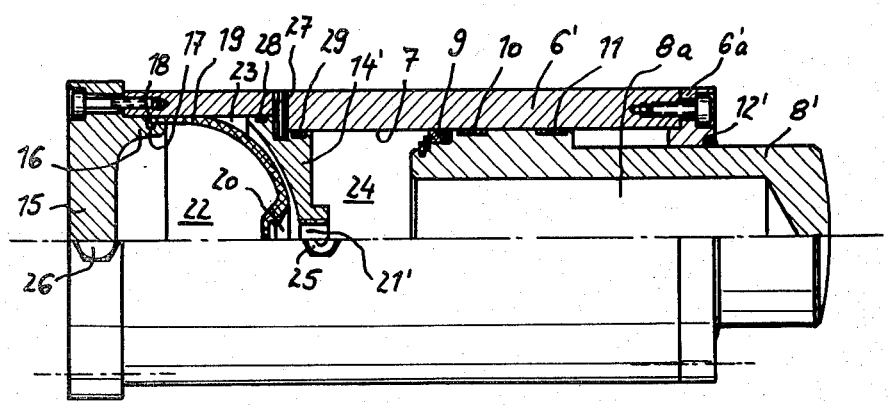

As seen in FIG. 1 the drive mechanism of a tracked vehicle 1 comprises two endless tracks 3, each driven, respectively by a drive wheel 2 and guided by a guide, respectively, wheel 4 which can apply tension to the track. The tensioning of each track 3 is achieved by a track tensioning unit 5 associated with the respective guide wheel 4. Each unit 5 has a bearing yoke on its end on which the guide wheel 4 is rotatably mounted. The shaft of this yoke is inserted in parallel guideways 1a on the drive mechanism of the tracked vehicle 1, which guideways are directed longitudinally with respect to the vehicle. The shaft is longitudinally adjustable along the guideways. The opposite end of each tensioning unit 5 to the bearing-yoke end can be lodged against a counter support which is attached to the frame of the drive mechanism and is disposed between the guideways. A cylinder 6 is attached to the bearing yoke and is similarly directed. A tensioning or "pressurizing" piston 8, acting as a plunger, is slidably housed, guided, and sealed in the interior cylindrical cavity of cylinder 6.

Under certain conditions it may also be advantageous for the bearing yoke and the cylinder 6 to have unit construction.

Figure 2:
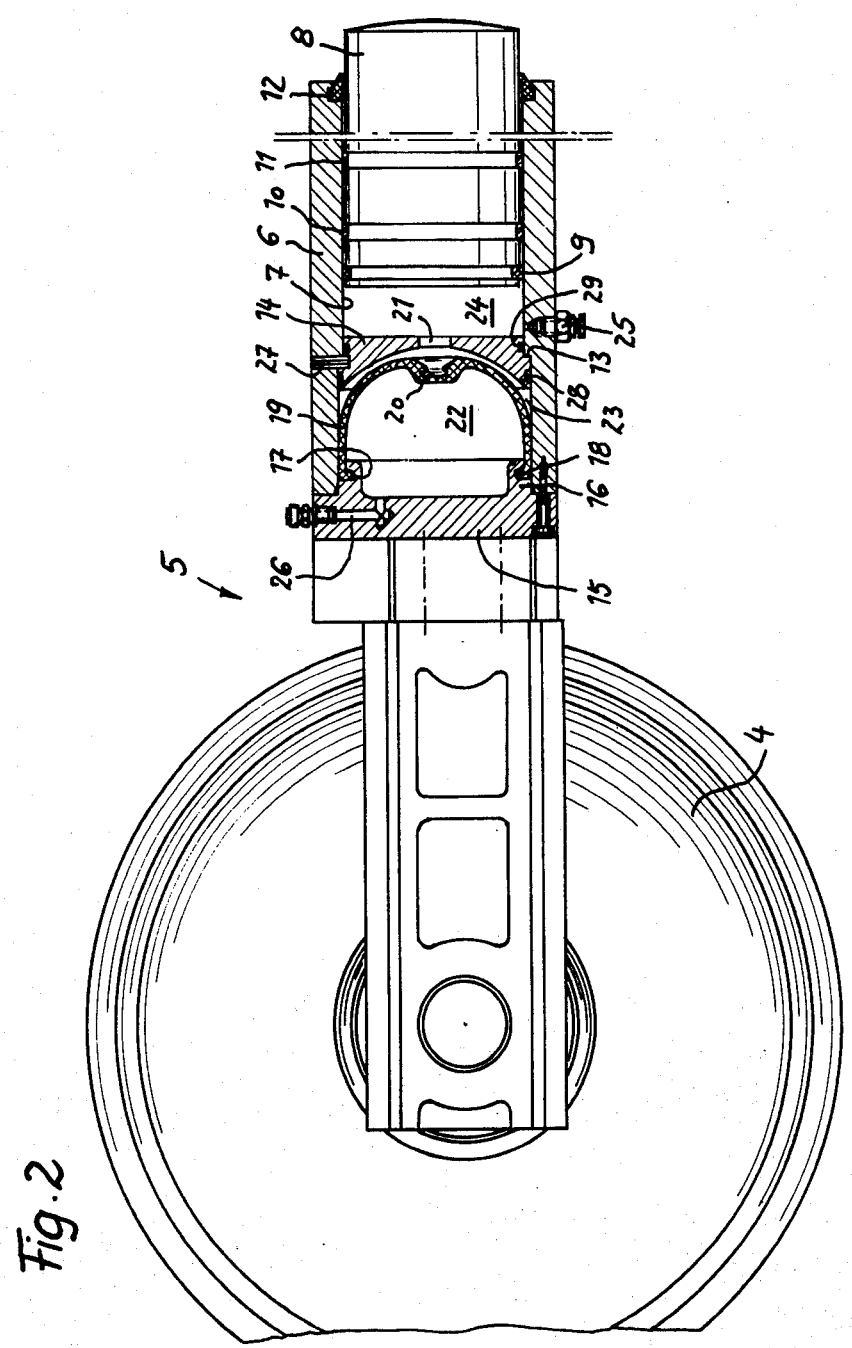
FIG. 2 is a front, partial breakaway view of a track tensioning unit of the invention.

A high pressure seal 9 (FIG. 2) serves for sealing the tensioning piston 8 in the cylinder 6. Low-friction movement of the tensioning piston 8 is promoted by slide rings 10 and 11. A dirt scraper 12 is mounted at the exit end of the cylinder 6.

At a certain distance from the free end of cylinder 6, said cylinder has a shoulder 13 on its interior surface, against which shoulder a membrane support 14 is lodged which extends transversely across the cylinder 6.

The free end of the cylinder 6 is closed off by a cover 15 which is screwed or bolted on, and has an apron 16.

The apron 16 has a ring-shaped groove 17 in its outer surface for accommodating a bead 18 of a membrane 19.

Centrally disposed on membrane 19 is a closure member 20 of greater rigidity and strength, so situated as to be able to close off a central penetration opening 21 in the membrane support 14. The membrane 19 separates a gas space 22 (located on the side toward the cover 15) from a working space 23 (on the side toward the membrane support 14), which working space can communicate through opening 21 with the main working space 24 which is formed between the tensioning piston 8 and the membrane support 14. Working space 24 can be filled with a liquid or grease through a fill opening 25 which opens out near the membrane support 14. The gas space 22 is filled through a closable gas fill opening 26 in the cover 15.

Possible axial motion of the membrane support 14 is prevented by the shoulder 13. Since shoulder 13 produces a change in cross sectional surface area, a force arises on membrane support 14 in the direction of shoulder 13, and support 14 can only be lifted off of shoulder 13 if the dynamic pressure of pressurizing medium flowing into the working space 24 produces a greater force than the force acting on the ring-shaped surface corresponding to the shoulder. In order to prevent such a lifting off, radially directed clamping sleeves 27, or the like, are provided which, at the same time, serve to release air from the space between seals 28 and 29.

For purposes of illustrating the operation of the device, let it be assumed that the track tensioning unit 5 has been "pre-pressurized" with gas, i.e., that the gas space 22 has been filled with a pressurized gas.

The membrane is thereby pressed against the inner cylinder wall and the membrane support 14, and the closure member 20 closes off the penetration opening 21 and at the same time prevents the membrane 19 itself from going through opening 21.

Let it be assumed, further, that working space 24 has not been filled with liquid or grease, and therefore that the piston 8 and cylinder are in the contracted position. Then let the track tensioning unit 5 be mounted. If liquid or grease is subsequently pumped into working space 24 through fill opening 25, the piston and cylinder will expand, whereby tension will be placed on the track 3.

The magnitude of the tension can be controlled, for example, by the amount of pressure applied.

The tensioning pressure i.e., piston pressure is ordinarily less than the abovementioned gas pre-pressurizing pressure, so that during the process of tensioning the track, the membrane 19 stays pressed against the membrane support 14.

If, however, a stone or the like comes between the track 3 and the drive wheel 2 or guide wheel 4, so as to increase the track tension excessively, the piston and cylinder, 8 and 6, respectively, will give way and move into a more compressed position, forcing the quasi-incompressible liquid or grease into working space 23, whereby membrane 19 is moved, the gas space 22 is made smaller, and the gas pressure increases in accordance with the compressive characteristic of the gas. When the foreign body is removed from the track, the liquid or grease is pressed back into working space 24 as a result of the gas pressure in gas space 22, until the piston and cylinder, 8 and 6, respectively, occupy their original positions. It should be mentioned at this point that the dimensions of shoulder 13 need to be chosen such that it can sustain the forces exerted on the membrane support by the gas pre-pressurizing. The clamping sleeves 27, on the other hand, need to be able to sustain only the relatively small pressure force generated when the liquid or grease is flowing through the penetration opening 21, namely only that force which exceeds the force acting on the ring-shaped surface defined by the shoulder 13.

Of course, with appropriate choices of dimensions, it is possible to hold the membrane support 14 fixed in both possible directions of motion by means of clamp bolts, bolts, spring rings, or the like.

Other means are also known for effecting the mounting and gas-sealing of the membrane edge 18 and/or the cover 15.

Finally, alternative methods are known for pre-pressurizing with the gas.

In order to reduce the weight of the track tensioning unit 5 without having to change its overall dimensions, a coaxial blind hole 8a may be provided in the tensioning piston 8 which opens out into working space 24.

In this case, the membrane support 14' is provided with a penetration opening 21' which has an interior thread. This makes it possible to pressure-test the membrane support 14' and cover 15 with the tensioning piston 8' out of the apparatus. A flange 6'a is provided for limiting the outward stroke of the tensioning piston 8'.

FIG. 4 shows an embodiment which differs from the one described above by having a reduced overall length (obtained by way of a reduced length of the separating element and reduced length of the gas space) and lower weight, and which further allows the use of tubular components, making costly drilling and boring operations unnecessary.

In this embodiment a cylinder 6" is hermetically closed off by a cover 15'. A tensioning piston 30 with inner bore 31 is slidably housed and sealed in cylinder 6". The outer end of piston 30 is hermetically closed off by a cover 32. A stroke-limiting piece in the form of a membrane support 14" is disposed near the inner end of piston 30. This membrane support 14" has a central penetration opening 21.

A groove 34 in piston 30 lies opposite a groove 35 in the membrane support 14". A spring ring 36 is inserted into the space formed by grooves 34 and 35 via a tangential opening (not shown) in piston 30. This ring secures the membrane support 14" against axial sliding.

The cup-shaped membrane 19' is secured in gas-tight fashion in approximately the middle of bore 31 (viewed axially) by means of a holding ring 33. The space between the piston cover 32 and the membrane 19' forms the gas space 22', while the space between the cylinder cover 15' and the tensioning piston 30 defines the operating space 24'. In the cylinder cover 15' there is a fill opening 25' extending radially outward for charging liquid or grease into working space 24'. This opening is closeable by a valve or the like.

Similarly, there is a closeable gas fill opening 26' in the piston cover 32, originating on the radial periphery and opening out into gas space 22'.

The shaped surface of membrane support 14" which faces membrane 19' is fitted to the shape of the membrane 19'. Membrane 19' is prevented from passing through penetration opening 21 under the action of the gas pre-pressurizing by means of a plate-shaped closure member 20' which is attached to membrane 19'.

This embodiment also has slide rings 10' and 11' in corresponding ring-shaped grooves on the tensioning piston 30, and has an endless high pressure seal 9'. The latter is mounted on a reduced-diameter recess on the piston 30, being slid on, and is secured in the direction opposite the sliding-on direction by a washer 9a, which is also slid on, and by a spring ring 9b which presses washer 9a against the adjacent end face of the high pressure seal 9′, which spring ring is set in a matching ring groove in piston 30.

Several bolts around the circumference are used to attach covers 15′ and 32; these bolts are screwed into matching threaded holes in cylinder 6″ and tensioning piston 30, respectively.

The mounting of membranes on cylindrical parts, as disclosed in Ger. OS No. 15 25 476 or Ger. OS No. 25 34 361, is already known. Further, the attaching of a cover or the like with the aid of a tangentially insertable spring ring is known, for example from U.S. Pat. No. 3,825,034.

For purposes of describing the operation of the device, let it be assumed that first the gas space 22′ is filled with a pressurized gas, preferably nitrogen or helium, through the gas fill opening 26′. The side of membrane 19′ facing the membrane support 14″ is then under slight expansion, and the closure member 20′ covers penetration opening 21. Fill opening 25′ can be opened and piston 30 can be slid to the full extent into cylinder 6″, whereupon the track tensioning unit 5 is inserted into the undercarriage of the tracked vehicle, and the track 3 can be conveniently passed around the guide wheel 4 and opening 25′ can be closed. At this point the working space 24′ is filled with liquid or grease by means of a pump.

Assuming that the pre-pressurizing pressure of the gas in gas space 22′ is higher than that needed to place the track 3 under the desired tension, the piston 30 is moved outward and the track 3 is placed under tension.

The amount of tension can be controlled with the aid of a manometer or other suitable measuring device. If subsequently during operation the track tension is increased, e.g. by a foreign body coming between the track and wheel, the piston 30 will move back inward. In the process, pressure medium will be pressed out of working space 24′ through penetration opening 21 and ahead of membrane 19′. This will cause an increase in the pressure in the gas space and a decrease in the size of the gas space. The amount of the pressure increase depends primarily on the amount of pressure medium transferred and the initial pre-pressurizing pressure of the gas, and is governed by the compression characteristic of the gas. Different compression characteristics curves will be followed, depending on the pre-pressurizing pressure of the gas.

After the foreign body is removed the gas which is under pressure forces the (liquid) pressure medium back into the working space 24′, and piston 30 moves outward until the membrane 19′ again lies against the membrane support 14″.

Changed conditions such as occur as a result of wear on the track elements can be easily adjusted to by adding more liquid or grease.

The invention is not limited to the exemplary embodiments. Thus, the membrane 19′ may be in the form of, e.g., a bag. Alternative means of attaching the membrane support 14″ are also possible; e.g., by means of pins or by a small step in the bore 31.

In order to exclude the possibility that in the event of a sudden failure of the membrane 19′ the gas pressure will act directly in the working space 24′, so as to separate the piston 30 and the cylinder 6″ with sudden force, leading possibly to an accident, in the exemplary embodiment of FIG. 5 a detent or stop is supplied to limit the excursion of piston 30′ with respect to cylinder 6‴, which detent is releasably attached to cylinder 6‴ and engages piston 30′. Cylinder 6‴ extends beyond the free end of piston 30′, and a flange 37 extending into the cylinder bore area 7′ is releasably attached to the cylinder at the free opening edge of the cylinder 6‴, by means of several bolts distributed around the circumference of the cylinder. Said flange has a ridge which engages with the bore 7′ and acts to center the flange with respect to the cylinder 6‴.

In addition there is an outward-extending rod 38 which extends out of cylinder 6‴ and is supported against the free end face of piston 30′. By means of this rod the piston 30′ can be supported against a counter support attached to the frame of the tracked vehicle 1. Accordingly, the part of rod 38 which extends beyond cylinder 6‴ must be at maximum protrusion at least as long as the stroke of piston 30′.

For proper orientation and holding of rod 38 it may be provided with bracing and centering pins on its end faces, which pins engage with corresponding holes in cover 32 and-or the said counter support attached to the frame of tracked vehicle 1, respectively.

FIG. 5 also shows the piston 30′ mounted so as to be rotationally fixed with respect to cylinder 6‴. For this purpose a guide slot 39 is provided in cylinder 6‴ running parallel to the cylinder axis near the end opening. A sliding and bracing piece 40 extends radially from the cover 32 and exclusively engages guide slot 39, being adjustably moveable along said slot. Sliding piece 40 has a bore hole which runs axially and opens out in the gas fill opening 26′. The exterior opening of said bore hole has a check valve 41 mounted in its outer opening, so as to close off flow when said valve is closed. On the outside of cylinder 6‴ the guide slot 39 is closed off by a protecting plate 42 which is removably bolted on. Also, inside and coaxial with the cylinder 6‴ there is a protective bellows 43, which may be made of rubber, for example, one opening edge of which is attached with a tight seal to flange 37 and the other edge of which is attached (also with a tight seal) to cover 32. Several bolts distributed around the circumference of the respective attaching loci are employed for the attachment.

For attaching the membrane support 14‴ to the piston 30′ the membrane support has an externally threaded zone 44 on its external cylindrical surface, which screws into a corresponding female thread 45 in the piston 30′. Also, there is a flange section 46 extending radially outward on membrane support 14‴, which flange is supported against the end face of piston 30′ which faces it. This flange also holds the high pressure seal 9′ in place.

FIG. 6 shows a variant of the means of attaching the membrane support. Ring-shaped grooves 34′ and 35′ lie opposite each other in the membrane support 14⁗ and the piston 30″, respectively. A spring ring 36′ is set in these grooves in such a way that half of it i.e., in the radial sense engages ring-shaped groove 34′ and half engages ring-shaped groove 35′.

The membrane support 14⁗ is braced by a washer 47 and several bolts 48. The washer 47 presses against the end face of the piston 30″ and at the same time holds the high pressure seal 9′ in position. If necessary, the washer holds said seal under pressure (prestressing).

FIG. 7 shows another advantageous embodiment of a membrane support 14⁗′ with penetration openings 49 in the form of multiple perforations. The closure member 20 connected with the membrane 19 is configured such that it covers the entire region of the penetration openings 49. One might alternatively provide the membrane with a fabric-type reinforcement on the side facing the membrane support, and dispense with the closure member.

We claim:

1. A hydro-pneumatic device for automatically adjusting the tension of an endless, flexible belt-type drive means comprising:
   a housing member;
   a cylindrical bore in said housing closed at one end thereof;
   a piston operatively sealingly slidable within said bore;
   a rigid partition in said bore defining a first chamber and a second chamber;
   an orifice means in said partition communicating said first chamber with said second chamber;
   a flexible membrane secured within one of said chambers proximate to said orifice means to close off one side thereof;
   a substantially concave surface on the side of said partition facing said chamber in which said membrane is secured;
   said flexible membrane having a shape substantially conforming to said substantially concave surface;
   said orifice means is positioned substantially centrally in said partition;
   a compressible fluid within said chamber in which said membrane is secured between said membrane and the end of the membrane chamber opposite said partition;
   a non-compressible fluid in the other chamber;
   a closure member of greater rigidity and strength than said membrane provided on said membrane adjacent to and facing said orifice and adapted to close said orifice when the compressible fluid pressure exceeds the non-compressible fluid pressure; and
   means for filling said fluids into and removing said fluids from the respective chambers.

2. The device as claimed in claim 1 wherein, said substantially concave surface comprises a hemispherically concave surface.

3. The device as claimed in claim 2 wherein said compressible fluid is a gas and said non-compressible fluid is oil.

4. A hydro-pneumatic device for automatically adjusting the tension of an endless, flexible belt-type drive means comprising:
   a housing having a cylindrical bore closed at one end to form a cylinder;
   a piston sealingly slidable within said cylinder;
   a rigid partition secured within said cylinder between the closed end thereof and the inner end of the piston defining a first chamber between said closed end of the cylinder and said partition and a second chamber between said partition and said inner end of the piston, and orifice means in said rigid partition providing communication between said first and second chambers;
   a flexible membrane secured within said first chamber and positioned proximately to said orifice means;
   a substantially concave surface on the side of said partition facing said first chamber;
   said flexible member having a shape substantially conforming to said substantially concave surface;
   a first compressible fluid within the first chamber between said closed end of the cylinder and said membrane;
   a second fluid within the second chamber;
   a closure member of greater rigidity and strength than said membrane provided on said membrane adjacent to and facing said orifice and adapted to close said orifice when the compressible fluid pressure in said first chamber exceeds the fluid pressure in said second chamber;
   a first fluid filling means located in a portion of said housing to permit said first fluid to be introduced into and removed from the first chamber between the closed end of the cylinder and said membrane; and
   a second fluid filling means located in a portion of said housing to permit said second fluid to be introduced into and removed from the second chamber.

5. The device as claimed in claim 4, wherein said substantially concave surface is hemispherically concave.

6. The device according to claim 5, wherein said first fluid is a gas and said second fluid is oil.

7. The device as claimed in claim 6 wherein said orifice means is positioned centrally in said partition.

8. The device as claimed in claim 5 wherein said first fluid is gas and said second fluid is oil, and further comprising a second bore in said housing coaxial with and having a larger diameter than said cylinder bore between said partition and said closed end of the cylinder, a radially extending shoulder between said bores, said closed end comprising an end cap, means to retain said end cap on said housing, an annular rib protruding from the inner face of said end cap into said first chamber having an outer diameter slightly smaller than the diameter of said second bore to snugly fit into the outer end of said second bore, an annular groove in the outer peripheral surface of said rib, an annular bead on the outer end of said flexible membrane extending substantially radially inwardly and interfitting within said rib groove to retain said outer end of the membrane against the wall of said second bore, said rib having a reduced diameter portion between the inner end thereof and said groove to facilitate fitting said membrane between said reduced diameter portion and said second bore, and said partition having a radially extending shoulder on its outer periphery in cooperative relationship with said shoulder between said bores to resist displacement of said partition toward said second chamber.

9. A hydro-pneumatic device for automatically adjusting the tension of an endless, flexible belt-type drive means comprising:
   a housing having a cylindrical bore closed at one end;
   a piston sealingly slidable within the cylindrical bore, said piston being hollow and defining a first piston chamber therein, a domed end on said piston defining a second chamber between said domed end and said closed end of the cylinder, orifice means in said domed end communicating said second chamber with said first chamber;
   a flexible membrane secured within said first chamber proximately to said orifice means;
   said domed end being formed by a substantially concave surface on the side of said end facing said first piston chamber;

said flexible membrane having a shape substantially conforming to said substantially concave surface;

a first compressible fluid within said first chamber between said membrane and the other end of said piston chamber;

a second fluid within said second chamber;

a closure member of greater rigidity and strength than said membrane provided on said membrane adjacent to and facing said orifice and adapted to close said orifice when the pressure of said first compressible fluid exceeds the pressure of said second fluid;

a first fluid filling means located in the piston to permit said first fluid to be introduced into and removed from the first chamber between said membrane and said other end; and a second fluid filling means located in the housing to permit said second fluid to be introduced into or removed from the second chamber.

10. The device according to claim 9, wherein said substantially concave surface is hemispherically concave.

11. The device according to claim 10, wherein said membrane is secured sealingly to the wall of said first piston chamber by means of an annular ring.

12. The device according to claim 10, wherein an annular stop is secured to the housing to limit the outward stroke of said piston.

13. The device as claimed in claim 10 wherein, said first fluid is a gas, said second fluid is oil, and said orifice means is positioned centrally in said domed end.

14. A hydro-pneumatic device for automatically adjusting the tension of an endless, flexible belt-type drive means comprising:

a housing having a cylindrical bore closed at one end to form a cylinder;

a piston sealingly slidable within said cylinder;

a rigid partition secured within said cylinder between the closed end thereof and the inner end of the piston defining a first chamber between said closed end of the cylinder and said partition and a second chamber between said partition and said inner end of the piston, and orifice means in said rigid partition providing communication between said first and second chambers;

a flexible membrane secured within said first chamber and positioned proximately to said orifice means;

said surface of said rigid partition which faces said first chamber is hemispherically concave, and said flexible membrane is shaped to conform to said surface;

a first compressible gas fluid within the first chamber between said closed end of the cylinder and said membrane;

a second fluid comprising oil within the second chamber;

a first fluid filling means located in a portion of said housing to permit said first fluid to be introduced into and removed from the first chamber between the closed end of the cylinder and said membrane;

a second fluid filling means located in a portion of said housing to permit said second fluid to be introduced into and removed from the second chamber;

a second bore in said housing coaxial with and having a larger diameter than said cylinder bore between said partition and said closed end of the cylinder;

a radially extending shoulder between said bores;

said closed end comprising an end cap;

means to retain said end cap on said housing;

an annular rib protruding from the inner face of said end cap into said first chamber having an outer diameter slightly smaller than the diameter of said second bore to snugly fit into the outer end of said second bore;

an annular groove in the outer peripheral surface of said rib;

an annular bead on the outer end of said flexible membrane extending substantially radially inwardly and interfitting within said rib groove to retain said outer end of the membrane against the wall of said second bore;

said rib having a reduced diameter portion between the inner end thereof and said groove to facilitate fitting said membrane between said reduced diameter portion and said second bore; and said partition having a radially extending shoulder on its outer periphery in cooperative relationship with said shoulder between said bores to resist displacement of said partition toward said second chamber.

* * * * *